(12) United States Patent
Waldera et al.

(10) Patent No.: US 12,345,278 B2
(45) Date of Patent: Jul. 1, 2025

(54) DEBRIS BLOWER WITH SOUND ATTENUATION RESONATOR

(71) Applicant: THE TORO COMPANY, Bloomington, MN (US)

(72) Inventors: Benjamin L. Waldera, Woodbury, MN (US); Samuel M. Mahaffey, Belle Plaine, MN (US); David W. Johnson, Hastings, MN (US)

(73) Assignee: THE TORO COMPANY, Bloomington, MN (US)

( * ) Notice: Subject to any disclaimer, the term of this patent is extended or adjusted under 35 U.S.C. 154(b) by 0 days.

(21) Appl. No.: 18/679,752

(22) Filed: May 31, 2024

(65) Prior Publication Data

US 2024/0401613 A1 Dec. 5, 2024

Related U.S. Application Data

(60) Provisional application No. 63/609,163, filed on Dec. 12, 2023, provisional application No. 63/470,587, filed on Jun. 2, 2023.

(51) Int. Cl.
| | |
|---|---|
| *F04D 29/66* | (2006.01) |
| *A01G 20/47* | (2018.01) |
| *F04D 19/00* | (2006.01) |
| *F04D 29/52* | (2006.01) |

(52) U.S. Cl.
CPC .......... *F04D 29/665* (2013.01); *A01G 20/47* (2018.02); *F04D 19/002* (2013.01); *F04D 29/522* (2013.01)

(58) Field of Classification Search
CPC .... F04D 29/665; F04D 19/002; F04D 29/522; A01G 20/47
See application file for complete search history.

(56) References Cited

U.S. PATENT DOCUMENTS

| | | | |
|---|---|---|---|
| 4,279,325 | A | 7/1981 | Challis |
| 5,289,612 | A | 3/1994 | Glenn, III |
| 5,979,013 | A | 11/1999 | Beckey et al. |
| 10,330,116 | B2 | 6/2019 | Bylund et al. |
| 11,434,929 | B2 | 9/2022 | Hoffman et al. |

(Continued)

FOREIGN PATENT DOCUMENTS

CN 107288084 B 9/2018

OTHER PUBLICATIONS

Li et al., "Acoustic Energy Harvesting Using Quarter-Wavelength Straight-Tube Resonator" ASME 2012 International Mechanical Engineering Congress & Exposition, Nov. 9-15, 2012; Houston, Texas, USA. Conference Paper; 8 pages.

*Primary Examiner* — Aaron R Eastman
(74) *Attorney, Agent, or Firm* — Mueting Raasch Group

(57) ABSTRACT

A blower apparatus includes a fan and motor generating an airflow from an inlet end to an outlet end of the debris blower. The airflow defines an airflow axis and a cross-sectional plane normal to the airflow axis. An enclosure provides an airflow path towards the outlet end. A resonant chamber is proximate an airflow entrance end of the enclosure. The resonant chamber has first and second sections encompassing corresponding first and second volumes of different sizes. The different sizes are selected to form an acoustic resonator. The acoustic resonator attenuates noise from the blower over a selected attenuation frequency range.

20 Claims, 9 Drawing Sheets

(56) References Cited

U.S. PATENT DOCUMENTS

| | | | |
|---|---|---|---|
| 2015/0345497 A1* | 12/2015 | Lucas | F04B 39/0027 |
| | | | 418/205 |
| 2017/0108011 A1 | 4/2017 | Johnson et al. | |
| 2018/0223873 A1* | 8/2018 | Ono | F04D 25/024 |
| 2018/0228326 A1* | 8/2018 | Crichton | A47L 5/14 |
| 2018/0231028 A1* | 8/2018 | Gautam | F04D 17/10 |
| 2019/0287510 A1* | 9/2019 | Goto | G10K 11/161 |
| 2020/0149535 A1* | 5/2020 | Takemoto | F04D 19/002 |
| 2020/0191103 A1* | 6/2020 | Gautam | F02M 35/1266 |
| 2021/0033115 A1* | 2/2021 | Hoffman | F04D 19/002 |
| 2021/0259167 A1* | 8/2021 | Wang | F04D 29/542 |
| 2022/0389938 A1* | 12/2022 | Hakuta | F04D 29/665 |
| 2023/0383767 A1* | 11/2023 | Lee | F04D 19/002 |
| 2024/0125259 A1* | 4/2024 | Le | F04D 29/665 |

* cited by examiner

Section 10-10

DEBRIS BLOWER WITH SOUND ATTENUATION RESONATOR

RELATED PATENT DOCUMENTS

This application claims the benefit of U.S. Provisional Application No. 63/470,587, filed on Jun. 2, 2023 and U.S. Provisional Application No. 63/609,163, filed on Dec. 12, 2023, both of which are incorporated herein by reference in their entireties.

SUMMARY

The present disclosure is directed to apparatuses and methods that can attenuate sound emitted from a debris blower. In one embodiment, a blower apparatus includes a fan and motor generating an airflow from an inlet end to an outlet end of the debris blower. The airflow defines an airflow axis and a cross-sectional plane normal to the airflow axis. An enclosure provides an airflow path around the fan. In one embodiment, the enclosure is configured as a motor enclosure that secures the motor to a housing of the debris blower. A resonant chamber is proximate an airflow entrance end of the enclosure. The resonant chamber has first and second sections encompassing corresponding first and second volumes of different sizes. The different sizes are selected to form an acoustic resonator. The acoustic resonator attenuates noise from the blower over a selected attenuation frequency range.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures. The drawings are not necessarily to scale.

DETAILED DESCRIPTION

Figure 1:
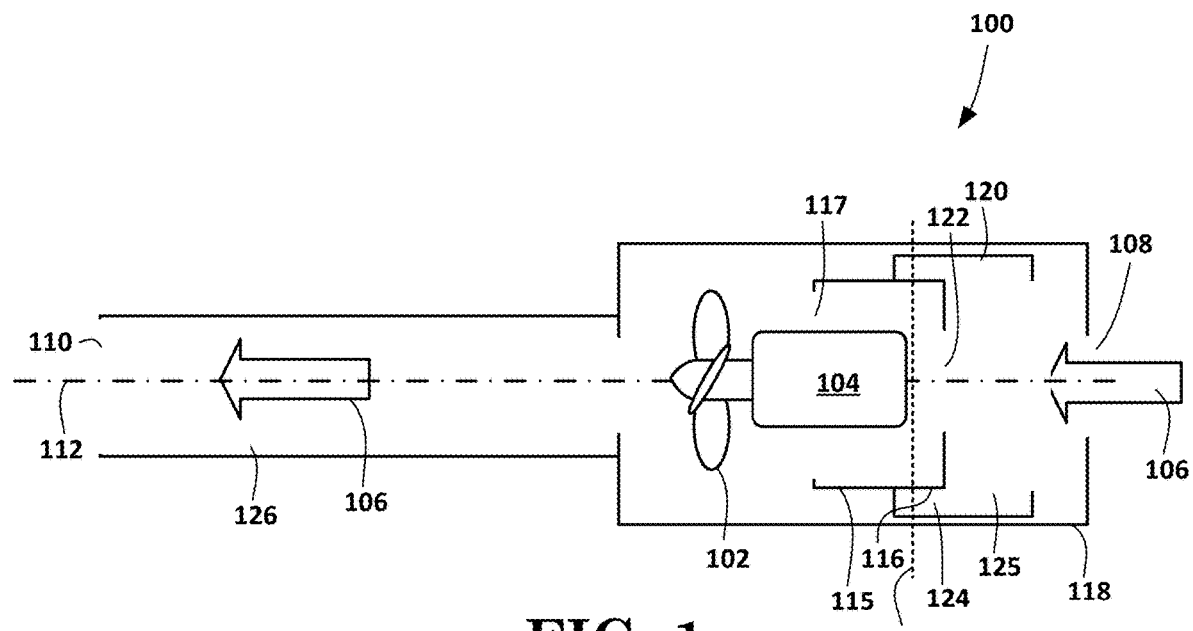
FIG. 1 is a block diagram of an apparatus according to an example embodiment.

In the following detailed description of illustrative embodiments, reference is made to the accompanying figures of the drawing which form a part hereof. It is to be understood that other equivalent embodiments, which may not be described and/or illustrated herein, are also contemplated.

The present disclosure relates generally to hand-held power tools. One class of hand-held tools, commonly referred to as leaf blowers or debris blowers, are versatile devices that can be used to in place of manual debris moving tools such as rakes and brooms. Debris blowers are often powered by a small, internal combustion engine (ICE) motor, which is effective but is noisy and requires regular maintenance, e.g., replacement of filters and spark plugs. Electric blowers are now commonly used as they tend to be quieter and easier to maintain than ICE blowers. Electric blowers may be corded (e.g., plugged into an AC outlet) or cordless (e.g., battery driven). For purposes of this disclosures, the terms "blower," "leaf blower," "yard blower," "debris blower," "outdoor blower," "handheld blower," etc., may be used interchangeably without loss of generality.

Some debris blowers can also double as vacuums. This may involve reversing rotation direction of a fan, adding a debris collection attachment, etc. Further a device that is primarily sold as handheld vacuum, shop vacuum, etc., may be similarly reconfigured as a blower. For example, some vacuums may have air input and air output ports with a common interface such that a hose can be attached to either the input or output port for different functions. For purposes of this disclosure, the description of a debris blower may also be construed to cover dual blower/vacuum devices, and the concepts described herein may be applicable to vacuum-only devices.

The noise generated by debris blowers is a common source of complaint. Even though electric blowers are generally quieter than ICE powered blowers, the electric motor, fan, and airflow still generates significant noise, and this noise is often at higher frequencies (e.g., above 1 kHz) that people find objectionable. Therefore, reducing the sound emitted from blowing devices (and other airflow generating devices such as vacuums) can make such devices more desirable. Reduction of noise can have other benefits, e.g., reduce risk of hearing loss for users who do not wear ear protection.

Embodiments described herein include devices and features that reduce noise generated by debris blowers, vacuums, and the like. In FIG. 1 a block diagram shows a, apparatus according to one or more embodiments. The apparatus is configured as a debris blower 100 in this example. The debris blower 100 includes an axially-arranged fan 102 and motor 104 generating an airflow 106 from an inlet end 108 to an outlet end 110 of the debris blower 100. Other airflow generators may be used besides axial fans may be used, e.g., a scroll fan. The airflow defines an airflow axis 112 and a cross-sectional plane 114 normal to the airflow axis 112. An outlet tube 126 directs the airflow 106 outside of the blower 100.

A motor enclosure 115 secures the motor 104 to a housing 118 of the debris blower 100 and, in this embodiment, provides an airflow path 117 around the motor 104 towards the outlet end 110. In other embodiments, the motor 104 may be secured elsewhere and in which case reference numeral 115 refers to an enclosure that provides the airflow path 117 around the motor 104 from the input end 108 to the towards the outlet end 110, A resonant chamber 120 is proximate an airflow entrance end 122 of the motor enclosure 115. The resonant chamber 120 includes first and second sections 124, 125. At least part of the motor enclosure 115 in this example protrudes into the resonant chamber 120 to delineate the first and second sections 124, 125, and therefore this part of the motor enclosure 115 will be referred to as a divider 116. The divider 116 could be formed by some other component besides the motor enclosure 115. The first and second sections 124, 125 encompass corresponding first and second volumes of different sizes. The different sizes are selected to form an acoustic resonator. The acoustic resonator attenuates noise from the blower 100 over a selected attenuation frequency range.

Note that the motor enclosure 115 and resonant chamber 120 are shown as separate components. This is one way to design the illustrated assembly, however other arrangements are possible. Generally, the acoustic resonator can be formed from different parts of different components than shown here, different parts of the same component, or just one component. Generally, it is the air within the first and second volumes that perform the attenuation, thus any number of structural forms could be used to perform the enclosure of air of the desired volume and optionally provide other functions (e.g., structural support, nozzle, expander, etc.)

Figure 2A:
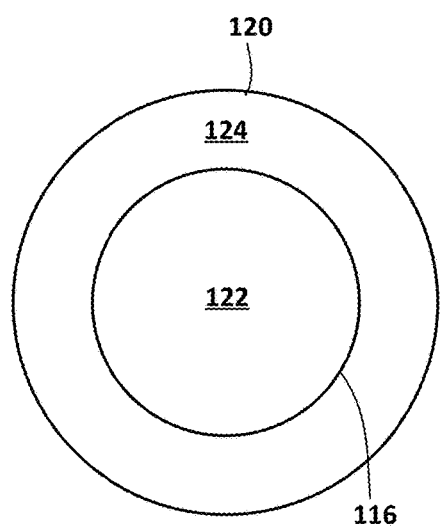
FIGS. 2A, 2B, 3A, and 3B are cross-sectional views of a resonator according to example embodiments.

In FIGS. 2A, 2B, 3A and 3B, cross-sectional views show examples of the first section 124 of the resonant chamber 120, roughly corresponding to a cross section along plane 114 shown in FIG. 1. In FIG. 2A, the first section 124 is annular in shape, defined by center-aligned, circular airflow entrance 122 and circular body of resonant chamber 120. In this case, the second section 125 (see FIG. 1) could have the circular cross-section shown for the resonant chamber 120, or could have a different shape.

Figure 2B:
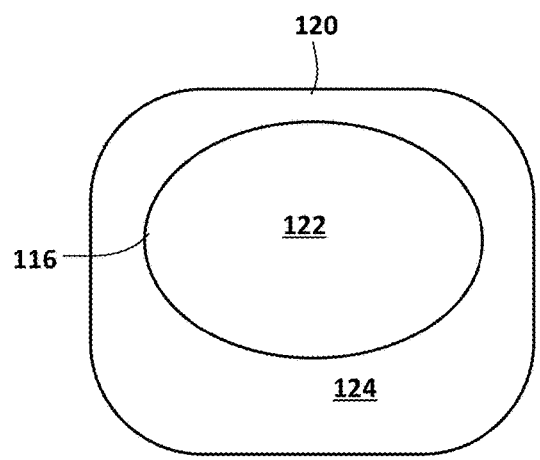

In FIG. 2B, the shape of the first section 124 is defined by an oval-shaped airflow entrance 122 and rounded rectangular body of resonant chamber 120. As with other embodiments, the second section 125 could have the same shape as for the resonant chamber 120 or could have a different shape as shown. Note that in both FIGS. 2A and 2B, the first section 124 is generally a ring-like volume. However, first volume 124 need not cover over the entire perimeter of the airflow entrance 122. Examples of alternate arrangements are shown in FIGS. 3A and 3B.

Figure 3A:
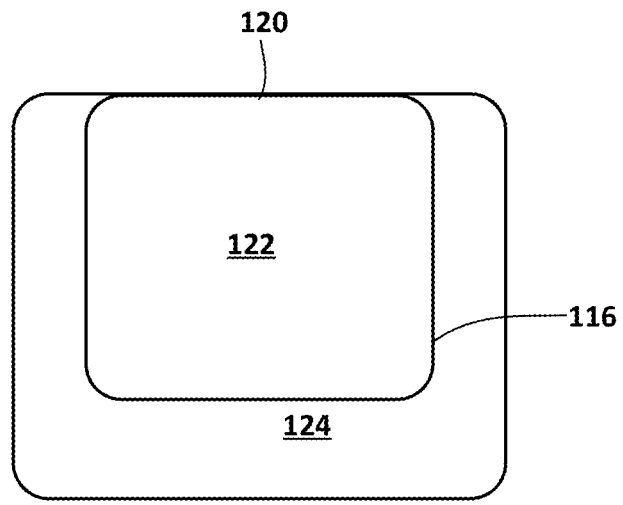
Figure 3B:
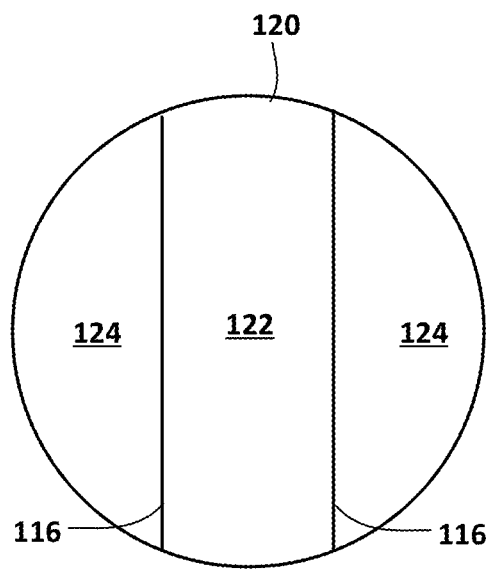

In FIG. 3A, the divider 116 abuts/adjoins the resonant chamber 120, which gives the first section 124 a U-shape. In FIG. 3B, the divider 116 fully divides the resonant chamber 120 into three sections, wherein the first section 124 a set of discrete and discontinuous shapes.

The cross-sections of the resonant chambers 120 and airflow entrances 122 shown in FIGS. 2A, 2B, 3A and 3B may be constant in the direction of the airflow axis 112, or may vary, e.g., having a taper, flare, restriction, etc. Other variations in the sizes, orientations, and shapes of the resonant chamber 120 and airflow entrances 122 will be apparent based on these examples.

The acoustic resonator formed by the resonant chamber 120 may operate as a quarter-wave generator or a Helmholz resonator. Generally, the volumes of first and second sections 124, 125 are selected to attenuate acoustic energy over a frequency range, e.g., operating as a low-pass, acoustic filter. The acoustic resonator can be used together with other sound suppression techniques (e.g., sound deadening coatings and/or insulators) to further reduce the amount of sound experienced by an operator of the apparatus.

The structural and flow path components of the debris blower 100 such as the housing 118, resonant chamber 120, motor enclosure 115 can be formed of any suitable materials. For mass production, injection molded plastics are often used due a number of factors, including light weight, low cost, corrosion resistance, ease of manufacture, etc. Nonetheless, other materials could be used for some components (e.g., metals, ceramics, composites) and/or different fabrication methods (e.g., stamping, 3D printing, casting) without deviating from the intended scope of this disclosure.

While an acoustic resonator according to embodiments described herein may be used on any type of blower (or vacuum) including ICE-powered blowers, the benefits may be more apparent when used with electric blowers. Electric blowers are typically quieter than ICE blowers due to the electric motor that drives the fan generating less noise then, for example, a two-stroke gasoline engine often employed on ICE blowers. Thus the fan tip noise and other airflow noises may comprise a larger component of the overall noise in an electric blower than an ICE blower. Electric blowers may include corded or cordless blowers, the former being powered by a power cord coupled to electrical lines (e.g., electrical mains, generator) and the former being powered by a battery or other charge storage device.

Figure 4:
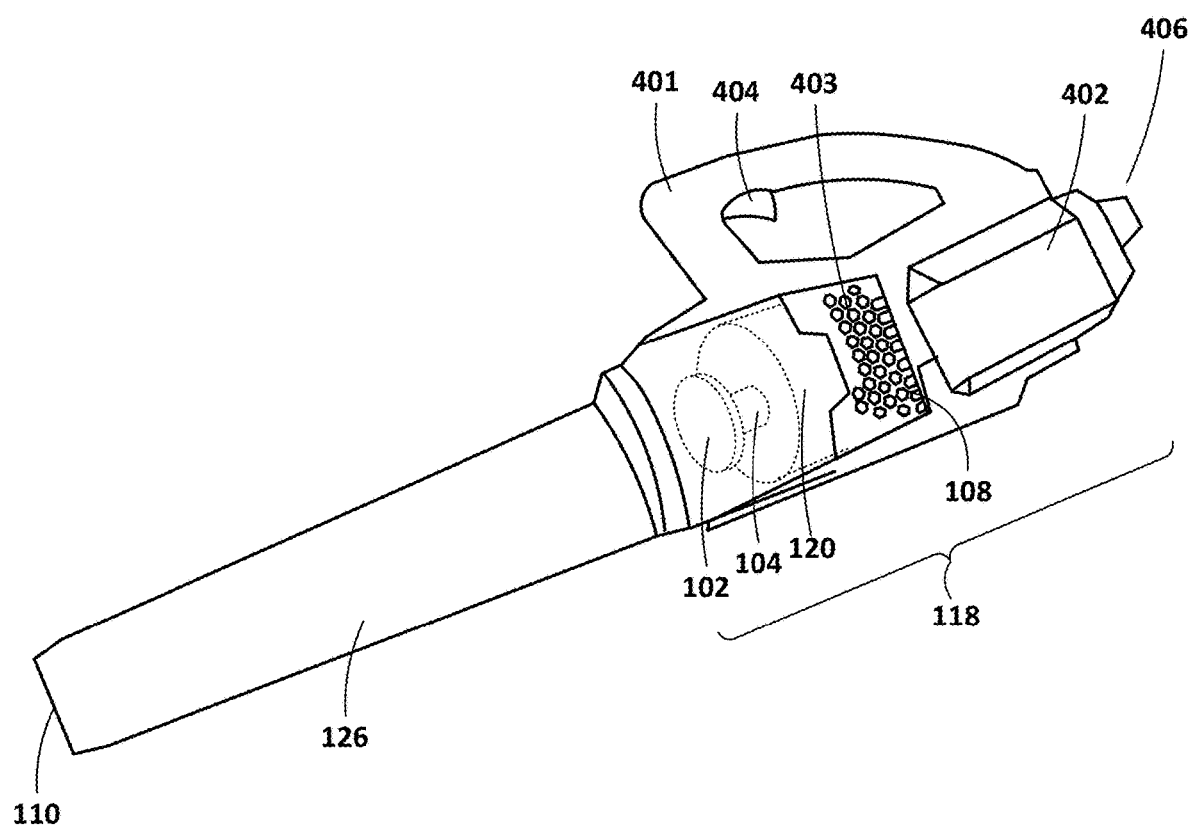
FIG. 4 is a perspective view of a debris blower according to an example embodiment.

In FIG. 4, a perspective view shows details of a debris blower 100 according to an example embodiment, in particular a battery powered blower. This figure shows similar components as in FIG. 1 with additional components such as removable battery 402. Also shown attached to or integrated with the housing 118 are handle 401, inlet grating 403, and trigger switch 404. The housing 118 and blower tube 126 are shown here as separate components, although in some embodiments they may be formed from a single part, e.g., stamped as one piece, two parts that are permanently joined through bonding or welding. The handle 401 and inlet grate 403 may also be integrated with the housing 118 and/or be separately attached parts (e.g., secured by snaps, fasteners, etc.). The trigger switch 404 is movable relative to the housing 118 and is used to activate/control the motor 104.

In the example shown in FIG. 4, the resonant chamber 120 is located, between the fan 102 and inlet grate 403. The inlet grate 108 is the closest part of the airflow to the operator, therefore placing the resonant chamber 120 proximate the inlet side of the airflow can effectively reduce sound transmitted to the operator. An inlet grate may be located at another location instead of the sides of the housing 118 as shown in FIG. 4, such as at a back end 406 of the debris blower 100.

Figure 5:
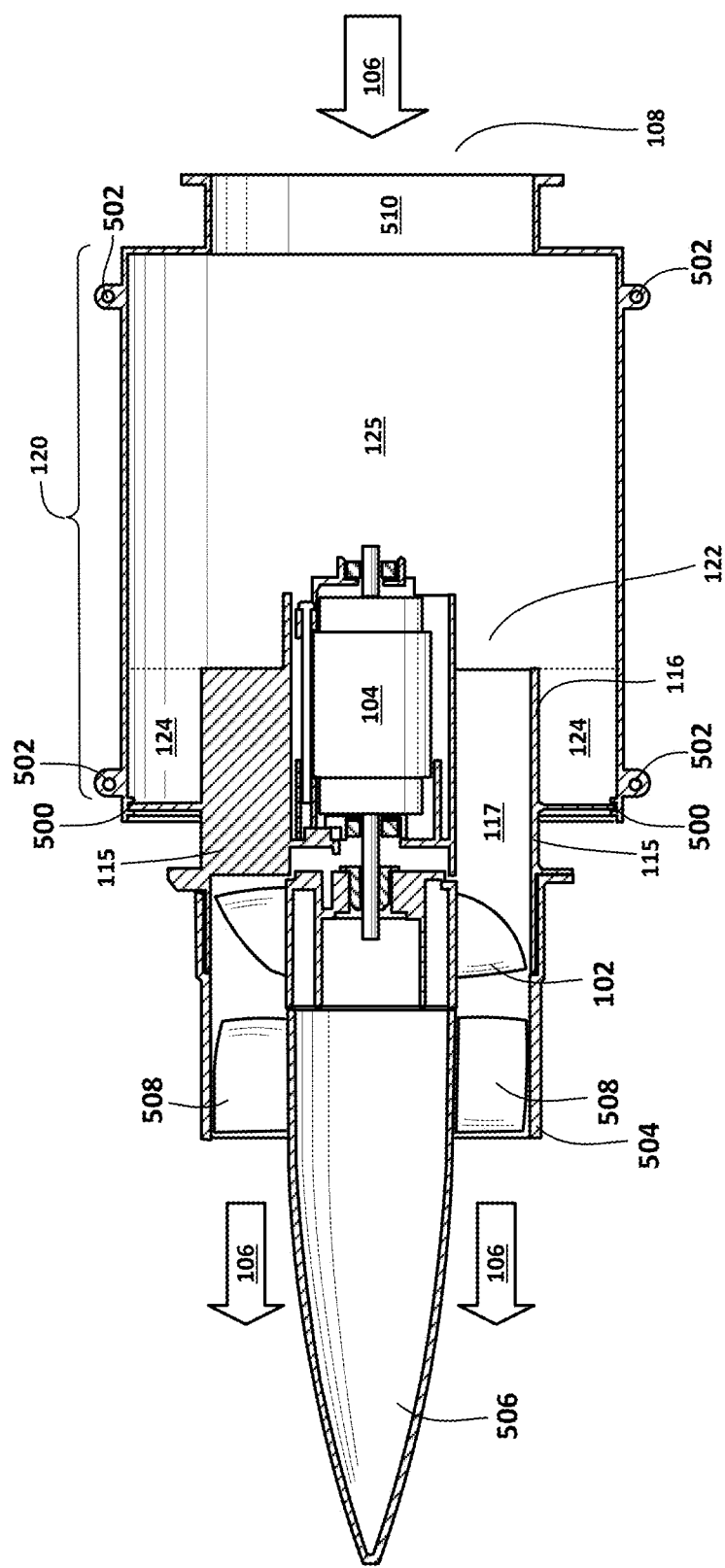
FIGS. 5-7 are cross-sectional views of resonators according to various embodiments.

In FIG. 5, a cross-sectional view shows details of a resonant chamber 120 according to an example embodiment. As seen in this view, the motor enclosure 115 is affixed to one end of the resonant chamber 120 via groove 500 that extend along an inner surface of the resonant chamber 120. The resonant chamber 120 includes mounting points (e.g., holes 502) that allow fastening two halves of the resonant chamber 120 together while trapping the motor enclosure 115 within the groove 500. The same or different mounting points can be used to fasten the resonant chamber 120 within the housing (not shown). In other embodiments, some or all of the resonant chamber 120 can be formed integrally within the housing or a sub-frame of the blower.

Also seen in FIG. 5 are a duct/shroud 504 mounted near an airflow-exiting-end of the fan 102. The duct 504 includes an outlet cone 506 supported by fins 508 that enhances airflow 106 exiting the fan 106. The duct 504 does not necessarily directly interact with the resonant chamber 120, however can affect the sound frequencies emitted from the fan 102 during operation, and therefore may be a consideration when selecting dimensions of the sections 124, 125 of the resonant chamber 120.

In this embodiment, resonant chamber 120 includes an inlet duct 510 that receives the airflow 106 from the inlet end 108 of the blower. This inlet duct 510 has a smaller cross-sectional area normal to the airflow 106 compared with that of the resonant chamber 120. This can help keep the airflow 106 centered along a path from the inlet duct 510 to the airflow path 117 of the motor enclosure 115, reducing secondary flows within the first section 124 (which is demarcated from the second section 125 using dotted lines), as well as near the inner surface of the first second section 125. The motor enclosure 115 protrudes into the resonant chamber 120 such that the first volume of the first section 124 surrounds part of the motor enclosure 115. The second volume is defined by the second section 125 that abuts the airflow entrance end 122 of the motor enclosure 115.

Figure 6:
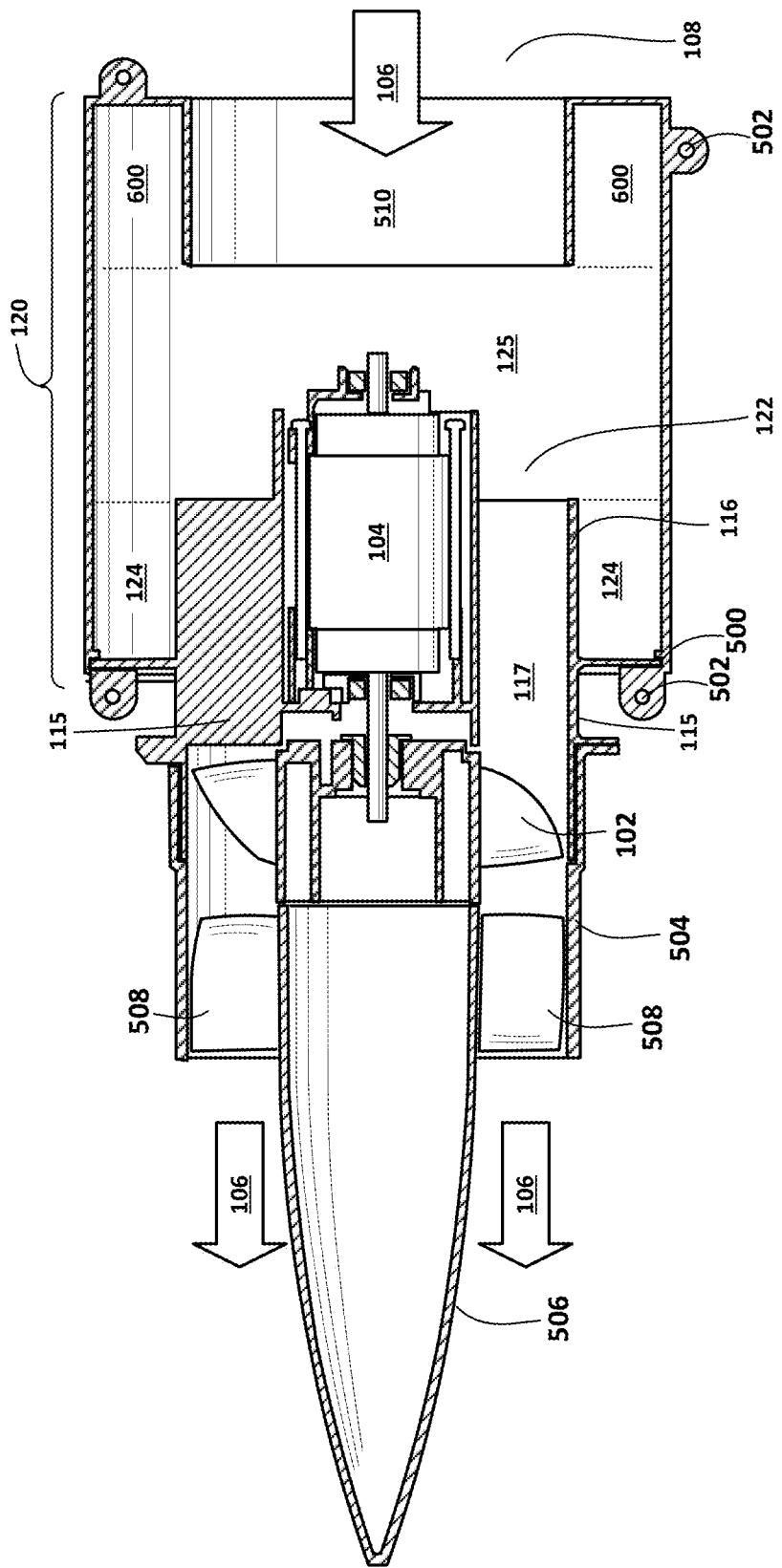

In FIG. 6, a cross-sectional view shows details of a resonant chamber 120 according to another example embodiment. In this embodiment, the resonant chamber 120 further comprises a third section 600 located at an airflow inlet end of the resonant chamber 120 opposed to the motor enclosure 115. The third section 300 may, for example, define an annular volume surrounding the inlet duct 510. As with the previous embodiment, the inlet duct 510 has a smaller cross-sectional area normal to the airflow 106 compared with that of the resonant chamber 120. The resonant chamber 120 in this embodiment includes similar features as other embodiments, such as groove 500 that holds motor enclosure 115 and mounting features (e.g., holes 502) that facilitate assembly.

Figure 7:
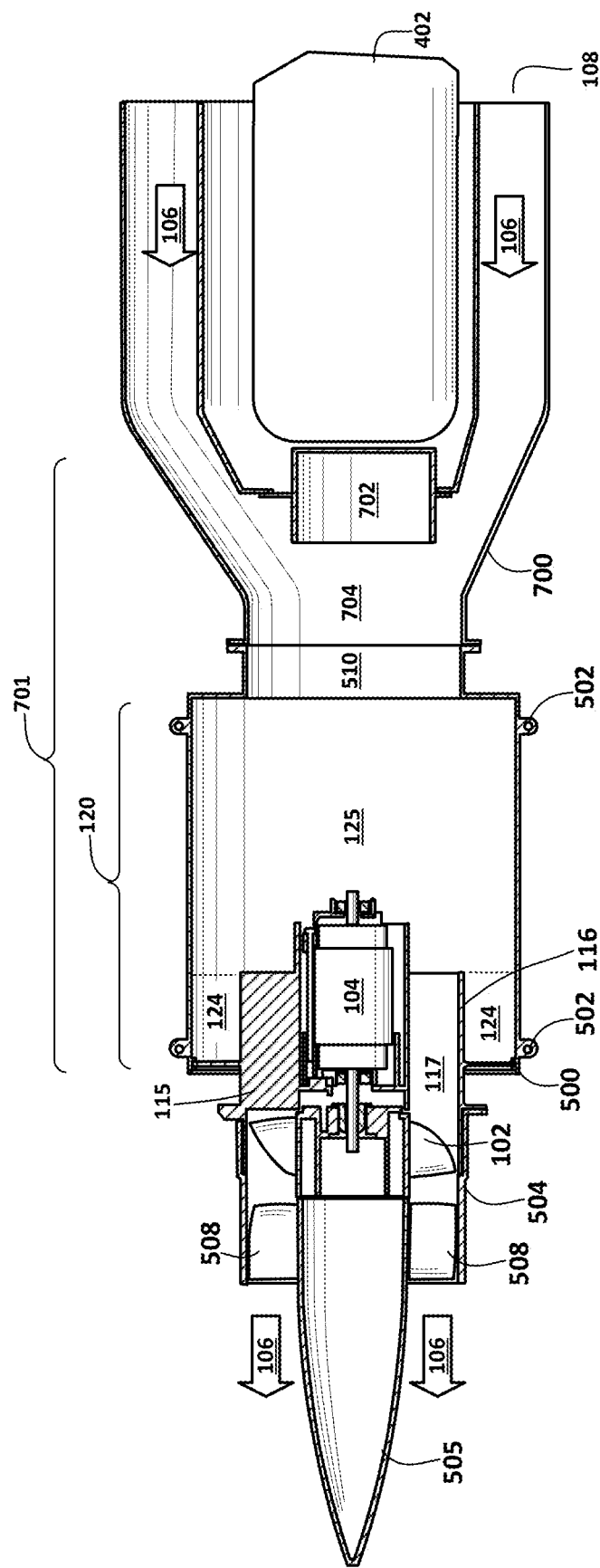

In FIG. 7, a cross-sectional view shows details of a resonant chamber 120 according to another example embodiment. In this embodiment, the blower further includes a blower inlet section 700 having an outlet end 704 coupled to the inlet duct 510 of the resonant chamber 120. The blower input section 700 includes an acoustic resonator 702 with an open end facing the inlet duct 510 of the resonant chamber 120. For the purposes of this example, the resonant chamber 120 and the acoustic resonator 702 together form a resonator section 701. The acoustic resonator 702 is complementary to the first and second sections 124, 125 of the resonant chamber 120, such that the resonator section 701 can be additionally tuned for desired acoustic performance.

Note that the acoustic resonator 702 may be used in an embodiment of the resonator section 701 without a two-section resonant chamber 120, e.g., a chamber with second section 125 and without first section 124. In this example, the blower input section 700 places the inlet end 108 of the blower proximate to a distal end of the battery 402. In other embodiments, the blower input section 700 may have side vents (not shown) that allow air intake from a side of the housing.

Figure 8:
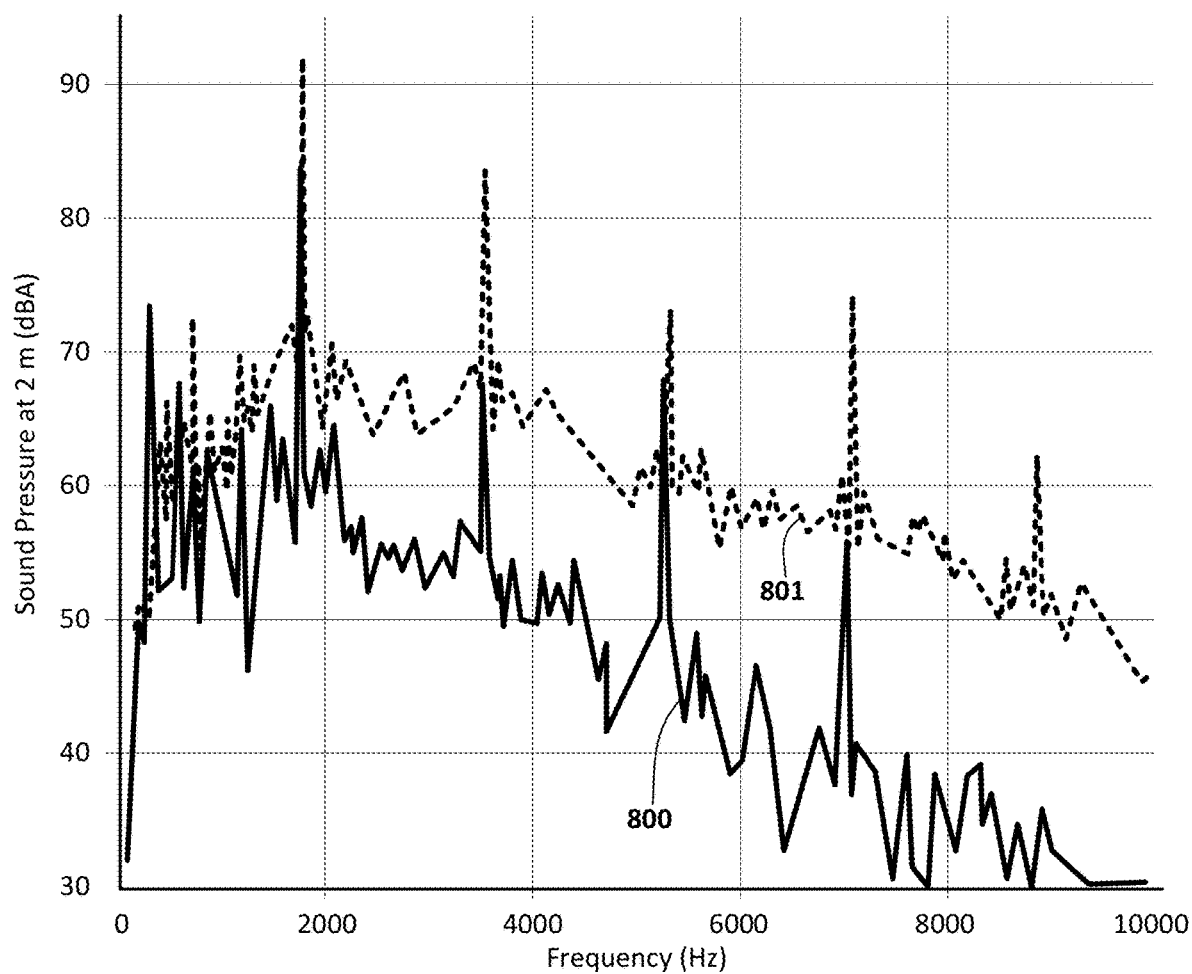
FIG. 8 is a graph of sound level measurements made on a prototype blower according to an example embodiment.

In FIG. 8, a graph shows a comparison of sound pressure level (SPL) measurements (solid line trace 800) made on a prototype blower that utilizes an acoustic resonator 120 as shown in FIG. 5 compared to SPL measurements (dotted line trace 801) of the same blower without the acoustic resonator 120. This graph shows that the acoustic resonator can be tuned to exhibit behavior of a low pass acoustic filter above approximately 1 kHz, and can provide significant attenuation above that frequency, e.g., around 18 dBA at 7 kHz. Note that the peaks are seen in both traces 800, 801 at around 1.8 kHz, 3.6 kHz, 5.4 kHz, etc. These are harmonics due to noise induced by the fan tips. The fan tip noise may be the largest component of noise in some embodiments, as measured by peak SPL amplitude.

Figure 9:
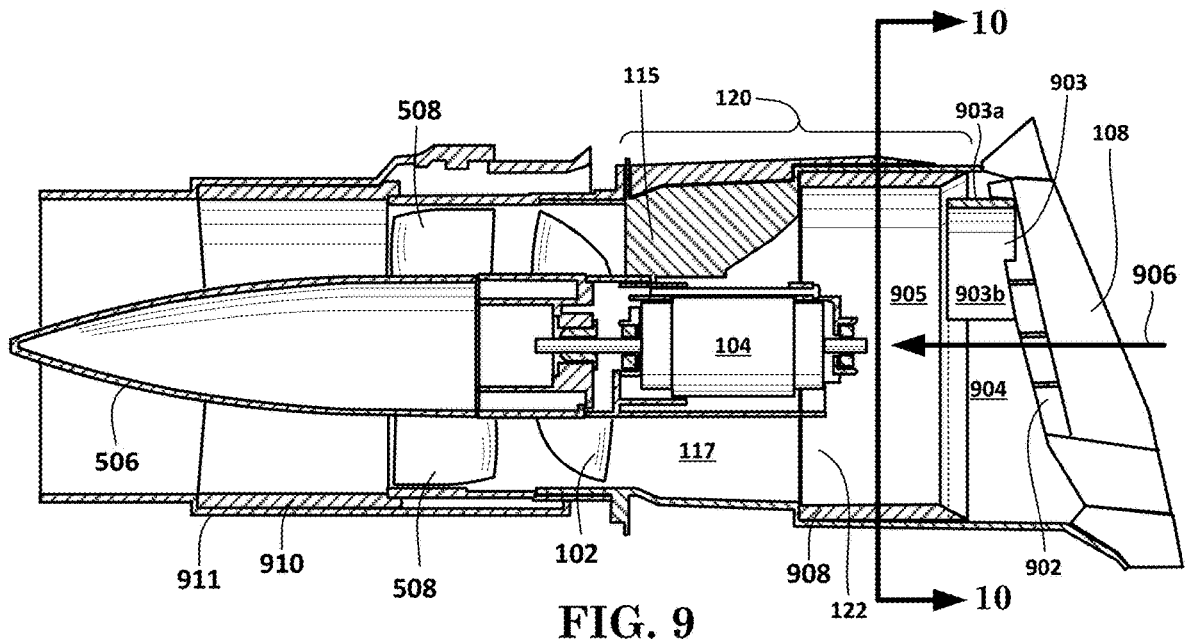
FIGS. 9 and 10 are cross-sectional views of a resonator according to another example embodiment.
Figure 10:
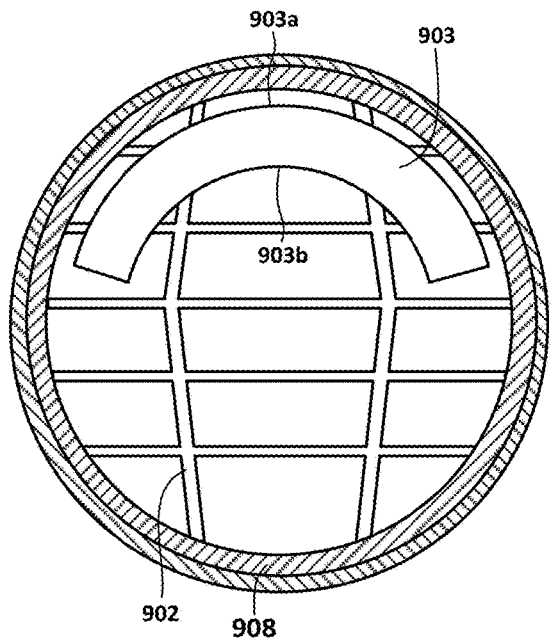

In FIGS. 9 and 10, cross-sectional views show details of a resonant chamber 120 according to another example embodiment. Reference numbers from previous figures are used in FIGS. 9 and 10 to indicate analogous components, such as fan 102, motor 104, airflow entrance end 122 of motor enclosure 115, outlet cone 506, and fins 508. The inlet end 108 of the debris blower includes an inlet grate 902, which may also be referred to as a grill, screen, grid, etc. In this example, the inlet grate 902 is between a battery compartment (not shown) and the resonant chamber 120. A wall member 903 protrudes from the inlet grate 902 towards the fan 102 and motor 104. The wall member 903 separates first and second sections 904, 905 of the resonant chamber 102. The first and second sections 904, 905 encompass corresponding first and second volumes of different sizes, a demarcation between the volumes being schematically indicated in the figure by a dotted line. The volume sizes of the first and second sections 904 are selected to form an acoustic resonator similar to other embodiments.

As seen in FIG. 9, the wall member 903 is generally aligned with an airflow direction 906 in the resonant chamber 102. In this example, the airflow direction 906 is substantially aligned with an axial direction of the debris blower. In embodiments where there is a significant taper angle between the inlet end 108 and the resonant chamber 102 (e.g., see FIG. 7), a wall member 903 may follow the taper angle depending on its location. Generally, major surfaces 903a, 903b of the wall member 903 are aligned with the airflow direction 906. If the surfaces 903a, 903b are not aligned with the airflow direction 906, this could increase a pressure drop along the wall member 903 compared to being aligned with the airflow direction 906.

As seen in FIG. 10, the wall member 903 has an arcuate, or semicircular shape. Other shapes of a wall member 903 may be used, such as a plate-like shape, a V-shape, etc. Further, the location of the wall member 903 relative to a top or at a bottom of the resonant chamber may be vary from what is shown yet still provide the desired acoustic resonator function. For example, the wall member 903 may be rotated some non-zero angle relative to the center of the inlet grate 904 compared to the illustrated orientation. The wall member 903 may be formed separately (e.g., molded) from the inlet grate 904 and attached via bonding, fasteners, etc. The wall member 903 and inlet grate 904 may be formed as a single piece, e.g., via injection molding, 3D printing, etc. A similar wall member may be used together with other resonant chambers where clearances allow and having an attachment point for the wall member, such as embodiments shown in FIGS. 5-7.

Also seen in FIGS. 9 and 10 are acoustic foam sections 908, 910 on respective inner surfaces of the resonant chamber 102 and outlet duct 911. The foam sections 908, 910 attenuate sound in the blower. The foam sections may be provided as a sheet material that is cut and bonded to the inner surfaces of the respective chambers/ducts. In other embodiments, the foam sections 908, 910 may be applied in other ways, such as sprayed onto the surfaces. Other sound deadening coatings or structures may be used in one or more of the locations besides or in addition to foam, such as paints, molded-in baffles, etc. Similar foam sections or other sound deadening may be applied on other surfaces, such as the wall member 903, areas surrounding the fan 102, etc. Further, the embodiments shown in FIGS. 5-7 may employ similar foam sections applied to respective inner surfaces of at least one of the inlet ends, the outlet ends, and the resonant chambers.

Figure 11:
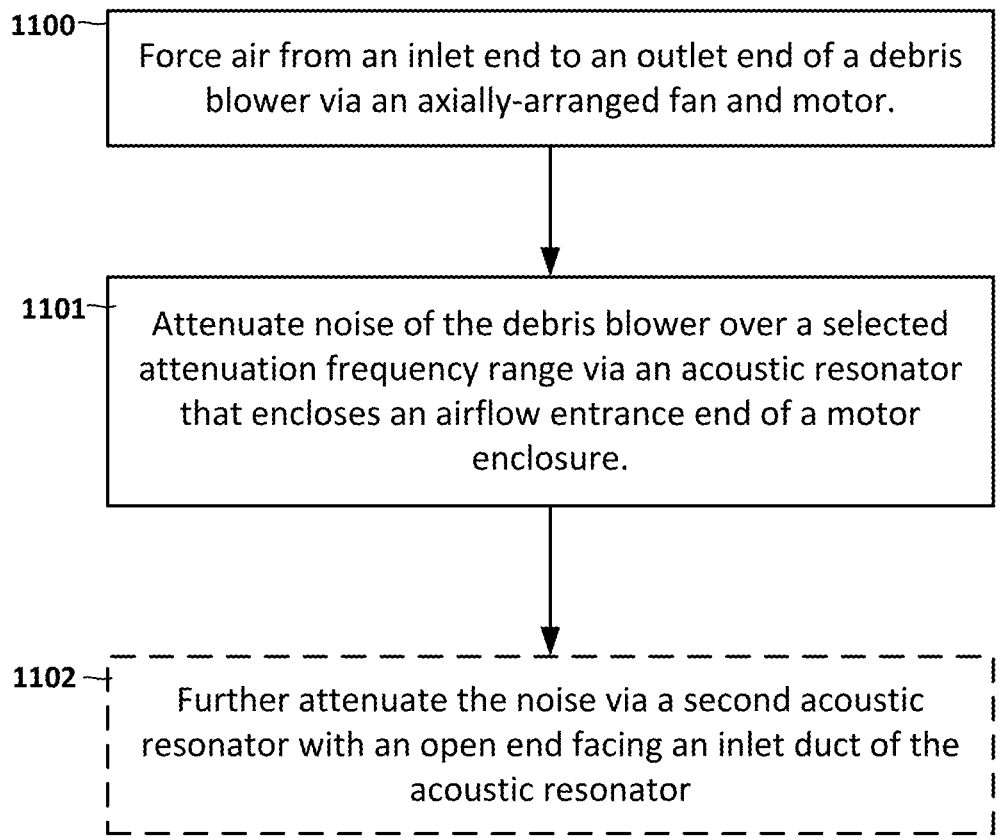
FIG. 11 is a flowchart showing a method according to example embodiments.

In FIG. 11, a flowchart shows a method according to an example embodiment. The method involves forcing 1100 air from an inlet end to an outlet end of a debris blower via an axially-arranged fan and motor. Noise of the debris blower is attenuated 1101 over a selected attenuation frequency range via an acoustic resonator that encloses an airflow entrance end of a motor enclosure. The resonant chamber includes first and second sections encompassing corresponding first and second volumes of different sizes selected to form the acoustic resonator. The method optionally involves further attenuating 1102 the noise via a second acoustic resonator with an open end facing an inlet duct of the acoustic resonator.

In summary, an apparatus and method are described that attenuate sound emitted from a debris blower or any other device that moves airflow. The attenuation involves a resonance chamber (e.g., Helmholz resonator or quarter wave resonator) this is placed on an air intake side of a fan. The attenuation can be selected to perform acoustic low pass filtering of the noise and can be combined with other noise mitigation techniques such as sound deadening coatings or fills.

While the present disclosure is not so limited, an appreciation of various aspects of the disclosure will be gained through a discussion of the specific illustrative examples provided below. Various modifications of the illustrative examples, as well as additional embodiments of the disclosure, will become apparent herein.

While the present disclosure is not so limited, an appreciation of various aspects of the disclosure will be gained through a discussion of the specific illustrative examples provided below. Various modifications of the illustrative aspects, as well as additional aspects of the disclosure, will become apparent herein.

Example 1 is debris blower, comprising: a fan and motor generating an airflow from an inlet end to an outlet end of the debris blower, the airflow defining an airflow axis and a cross-sectional plane normal to the airflow axis; an enclosure securing the motor to a housing of the debris blower and providing an airflow path around the motor towards the outlet end; and a resonant chamber proximate an airflow entrance end of the enclosure, the resonant chamber comprising first and second sections encompassing corresponding first and second volumes of different sizes, the different sizes selected to form an acoustic resonator, the acoustic resonator attenuating noise from the blower over a selected attenuation frequency range.

Example 2A includes the debris blower of example 1, further comprising: an inlet grate proximate the airflow entrance end; and a wall member that protrudes from the inlet grate towards the fan and motor, the wall member separating the first and second sections. Example 3A includes the debris blower of example 2A, wherein the wall member comprises a semicircular shape. Example 4A includes the debris blower of example 2A or 3A, wherein the wall member comprises major surfaces that are aligned with an airflow direction in the resonant chamber.

Example 2 includes the debris blower of example 1, wherein the airflow entrance end of the enclosure protrudes into the resonant chamber to define the first volume. Example 3 includes the debris blower of example 1 or 2, wherein the acoustic resonator attenuates noise above 1 kHz. Example 4 includes the debris blower of any preceding example, wherein the acoustic resonator attenuates fan tip noise from the blower. Example 5 includes the debris blower of any preceding example, wherein the acoustic resonator comprises a quarter-wave generator or a Helmholz resonator.

Example 6 includes the debris blower of any preceding example, further comprising a blower inlet section having a first end coupled to the second section of the resonant chamber, the resonant chamber having a larger cross-sectional area projected on the cross-sectional plane than that of the blower inlet section at the first end. Example 7 includes the debris blower of example 6, wherein the blower input section comprises a second acoustic resonator with an open end facing an inlet duct of the resonant chamber.

Example 8 includes the debris blower of any preceding example, wherein the enclosure protrudes into the resonant chamber such that the first volume surrounds part of the enclosure and the second volume abuts the airflow entrance end of the enclosure. Example 9 includes the debris blower of example 8, wherein the first volume comprises a circular annulus, and wherein the second volume comprises a cylinder. Example 10 includes the debris blower of example 9, wherein the resonant chamber further comprises a third section located at an airflow inlet end of the resonant chamber opposed to the enclosure, the third section encompassing a circular annular volume.

Example 11 includes the debris blower of any preceding example, wherein the motor comprises an electric motor. Example 12 includes the debris blower of example 11, further comprising a battery that powers the electrical motor. Example 13 includes the debris blower of any preceding example, wherein the first and second volumes are centered relative to each other. Example 14 includes the debris blower of any preceding example, wherein the acoustic resonator is located between the fan and an operator of the debris blower, the acoustic resonator attenuating noise from the blower transmitted to the operator.

Example 15 is a method, comprising forcing air from an inlet end to an outlet end of a debris blower via a fan and motor; and attenuating noise of the debris blower over a selected attenuation frequency range via an acoustic resonator that encloses an airflow entrance end of a enclosure, the resonant chamber comprising first and second sections encompassing corresponding first and second volumes of different sizes selected to form the acoustic resonator.

Example 16 includes the method of example 15, further comprising attenuating the noise via a second acoustic resonator with an open end facing an inlet duct of the acoustic resonator. Example 17 includes the method of example 15 or 16, further comprising attenuating the noise via a third section located at an airflow inlet end of the resonant chamber opposed to the enclosure, the third section encompassing an annular volume. Example 18 includes the method of example 15, further comprising attenuating the noise via a wall member that protrudes from the inlet grate towards the fan and motor, the wall member separating the first and second sections.

It is noted that the terms "have," "include," "comprises," and variations thereof, do not have a limiting meaning, and are used in their open-ended sense to generally mean "including, but not limited to," where the terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure, or while the machine is in an operating configuration. These terms are used only to simplify the description, however, and not to limit the interpretation of any embodiment described. As used herein, the terms "determine" and "estimate" may be used interchangeably depending on the particular context of their use, for example, to determine or estimate a position or pose of a vehicle, boundary, obstacle, etc.

Further, it is understood that the description of any particular element as being connected to coupled to another element can be directly connected or coupled, or indirectly coupled/connected via intervening elements.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather determined by the claims appended hereto.

The invention claimed is:

1. A debris blower, comprising:
   a fan and motor generating an airflow from an inlet end to an outlet end of the debris blower, the airflow defining an airflow axis and a cross-sectional plane normal to the airflow axis;
   an enclosure that provides an airflow path around the fan from the inlet end towards the outlet end; and
   a resonant chamber proximate an airflow entrance end of the enclosure, the resonant chamber partially enclosing the enclosure, and the resonant chamber comprising first and second sections encompassing corresponding first and second volumes of different sizes, the different sizes selected to form an acoustic resonator, the acoustic resonator attenuating noise from the blower over a selected attenuation frequency range.

2. The debris blower of claim 1, further comprising:
   an inlet grate proximate the airflow entrance end; and
   a wall member that protrudes from the inlet grate towards the fan and motor, the wall member separating the first and second sections.

3. The debris blower of claim 2, wherein the wall member comprises a semicircular shape.

4. The debris blower of claim 2, wherein the wall member comprises major surfaces that are aligned with an airflow direction in the resonant chamber.

5. The debris blower of claim 1, wherein the airflow entrance end of the enclosure protrudes into the resonant chamber to define the first volume.

6. The debris blower of claim 1, further comprising a blower inlet section having a first end coupled to the second section of the resonant chamber, the resonant chamber having a larger cross-sectional area projected on the cross-sectional plane than that of the blower inlet section at the first end.

7. The debris blower of claim 6, wherein the blower inlet section comprises a second acoustic resonator with an open end facing an inlet duct of the resonant chamber.

8. The debris blower of claim 1, wherein the enclosure protrudes into the resonant chamber such that the first volume surrounds part of the enclosure and the second volume abuts the airflow entrance end of the enclosure, wherein the first volume comprises a circular annulus, and wherein the second volume comprises a cylinder.

9. The debris blower of claim 8, wherein the resonant chamber further comprises a third section located at an airflow inlet end of the resonant chamber opposed to the enclosure, the third section encompassing a circular annular volume.

10. The debris blower of claim 1, wherein the first and second volumes are centered relative to each other.

11. The debris blower of claim 1, further comprising a sound dampening foam applied to an inner surface of at least one of the inlet end, the outlet end, and the resonant chamber.

12. The debris blower of claim 1, wherein the acoustic resonator attenuates noise above 1 kHz.

13. The debris blower of claim 1, wherein the acoustic resonator attenuates fan tip noise from the blower.

14. The debris blower of claim 1, wherein the acoustic resonator comprises a quarter-wave generator or a Helmholz resonator.

15. The debris blower of claim 1, wherein the motor comprises an electric motor.

16. The debris blower of claim 1, wherein the acoustic resonator is located between the fan and an operator of the debris blower, the acoustic resonator attenuating noise from the blower transmitted to the operator.

17. A method, comprising:
   forcing air from an inlet end to an outlet end of a debris blower via a fan and motor; and
   attenuating noise of the debris blower over a selected attenuation frequency range via an acoustic resonator that encloses an airflow entrance end of an enclosure, the acoustic resonator partially enclosing the enclosure, and the acoustic resonator comprising first and second sections encompassing corresponding first and second volumes of different sizes selected to form the acoustic resonator.

18. The method of claim 17, further comprising attenuating the noise via a second acoustic resonator with an open end facing an inlet duct of the acoustic resonator.

19. The method of claim 17, further comprising attenuating the noise via a third section located at an airflow inlet end of the acoustic resonator opposed to the enclosure, the third section encompassing an annular volume.

20. The method of claim 17, further comprising attenuating the noise via a wall member that protrudes from an inlet grate towards the fan and motor, the wall member separating the first and second sections.

* * * * *